Patented June 12, 1928.

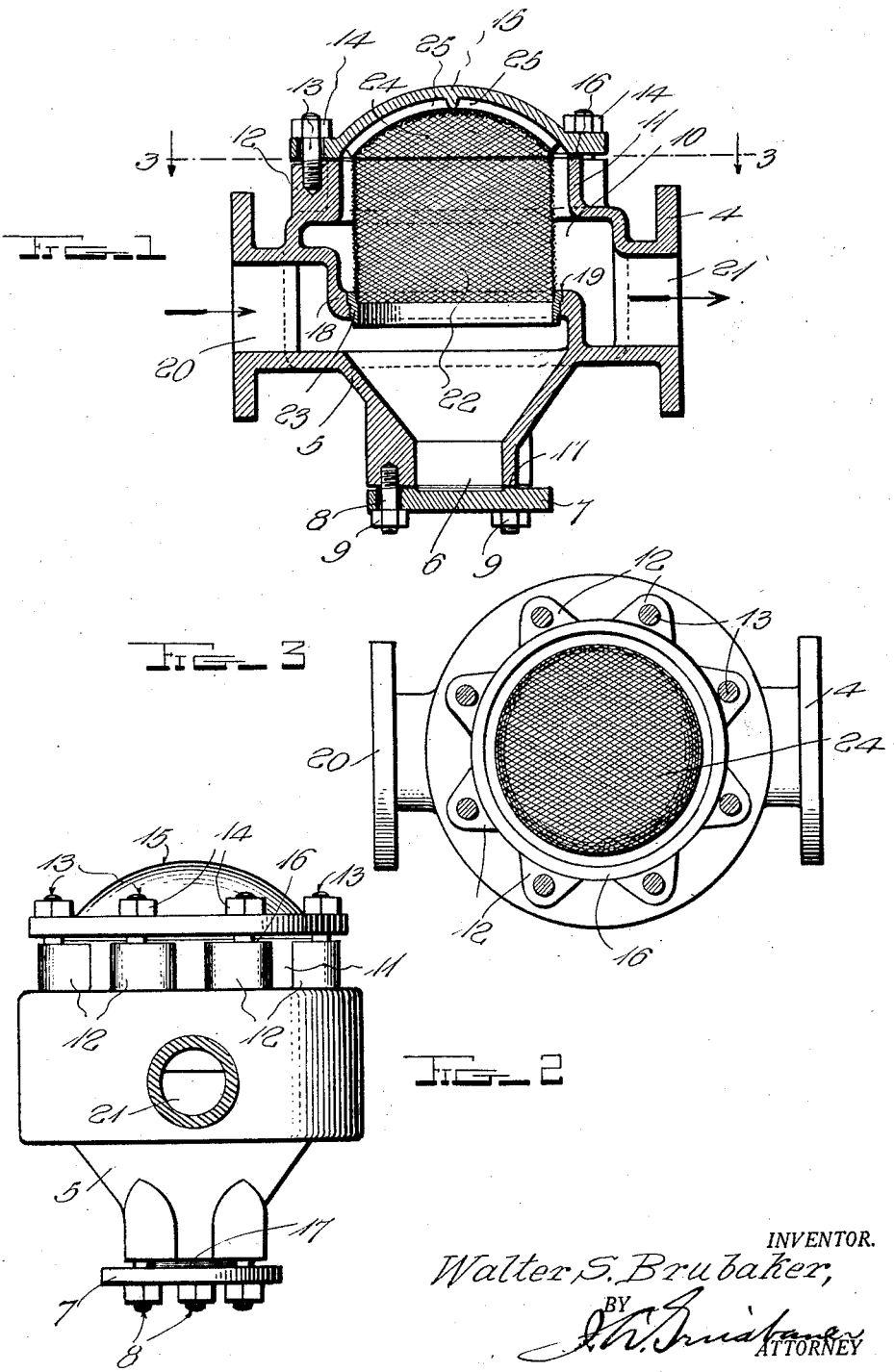

1,673,391

UNITED STATES PATENT OFFICE.

WALTER S. BRUBAKER, OF OAKLAND, CALIFORNIA, ASSIGNOR, BY MESNE ASSIGNMENTS, TO GRANBERG METER CORPORATION, OF SAN FRANCISCO, CALIFORNIA, A CORPORATION OF CALIFORNIA.

STRAINER.

Application filed November 29, 1926. Serial No. 151,520.

The invention relates to improvements in devices for removing foreign matter from liquid, and it is the object of the invention to provide a new and improved strainer in which all foreign matter separated from the liquid by the strainer, is deposited into a sump, from which it may be removed from time to time, novel provision being made for holding the strainer removably in place, so that whenever cleaning of such strainer is advisable, this cleaning may be readily accomplished.

With the foregoing in view, the invention resides in the novel subject matter hereinafter described and claimed, the description being supplemented by the accompanying drawings.

Fig. 1 is a vertical longitudinal section through a strainer constructed in accordance with the invention.

Fig. 2 is an end elevation partly in section.

Fig. 3 is a horizontal sectional view on line 3—3 of Fig. 1.

In the drawings above briefly described, the numeral 4 designates a shallow, cylindrical casing whose bottom 5, provided with an opening 6, slants or declines to said opening, and is provided with a removable cover plate 7 for this opening, said plate being preferably held in place by studs 8 and nuts 9. The top of the casing 4 is formed with a rather large central opening 10. A continuous flange 11 rises from said top around this opening, and circumferentially spaced bosses 12 are provided in the angle between said flange and top, said bosses being integral with both of these parts, so as to perform an effective reinforcing function, as well as serving to receive and hold a plurality of studs 13, which studs are co-operable with nuts 14, to hold a dome-like cover plate 15 in place upon the upper edge of the flange 11, a suitable gasket 16 being provided for this cover plate while a similar gasket 17 is utilized for the plate 7.

Between its upper and lower ends, the casing 4 is provided with a horizontal partition 18 having a comparatively large central opening 19 whose wall is preferably stepped. One side of the casing is provided with a lateral liquid inlet 20 leading to the portion of the casing under the partition 18, while a lateral outlet 21 is provided at the opposite side of said casing, leading from the space above said partition.

A cylindrical strainer 22 is provided with an open lower end engaging the partition 18, said end preferably having a stepped ring 23 which removably engages the stepped wall of the opening 19. At its upper end, the strainer 22 is provided with a dome-like top portion 24 which is downwardly spaced from the cover plate 15, and the lower side of this cover plate is provided with appropriate ribs 25 which contact with the portion 24 of the strainer, so as to maintain the desired spaced relation between this portion and the cover plate 15, as well as holding the ring 23 engaged with the partition 18. Suitable space exists between the cylindrical wall of the strainer and the flange 11, as well as between the portions 15 and 24.

All liquid passing from the inlet 20 to the outlet 21, must flow through the strainer 22—24 with the result that the latter will check any foreign matter and such matter will descend into the sump provided by the depressed bottom 5 and the plate 7. Whenever advisable, this plate may be removed to permit cleaning of the sump. Also, by removing the cover plate 15, the entire strainer 22 may be upwardly withdrawn. Thus, not only can this strainer be effectively cleaned, but access is had to the interior of the casing for thoroughly cleaning the same, the plate 7 being preferably removed when such cleaning is being done, so that any loosened matter may be rinsed or washed from the sump and the adjacent portion of the casing, such matter being discharged through the opening 6.

Attention is invited to the fact that the connection between the parts 18 and 23, is in the nature of a slip-joint and this joint or seal does not depend upon holding of the strainer 22 firmly against a seat such as a flat or conical seat analogous to those employed with valves. This simplifies construction considerably and furthermore, it is assurance of obtaining a good joint or seal between the strainer 22 and the partition 18, without special care on the part of the operator. If he is successful in inserting the strainer and tightly closing the cover plate 15 without undue strain or pressure, he is certain that the strainer is making proper contact with the strainer housing and that no dirt will leak through the joint. The strainer can have quite an appreciable vertical movement without disturbing the tightness of the seal.

As excellent results are obtainable from the details disclosed, such details are preferably followed. However, within the scope of the invention as claimed, variations may be made.

I claim:—

1. A strainer comprising a casing having a horizontal partition formed with an opening, said casing being provided with a lateral liquid inlet below said partition and with a lateral liquid outlet above the same, said casing having a depressed bottom provided with a removable plate, and having a detachable dome-like cover plate, and a cylindrical screen having an open lower end engaging said partition around the opening thereof, the upper end of said screen having a dome-like top underlying said dome-like cover plate, the latter having projecting ribs on its lower side contacting with said screen top to hold the screen engaged with the partition as long as said cover plate is held in place.

2. A strainer comprising a shallow substantially cylindrical casing having alined central openings in its top and bottom, provided with a horizontal partition also having a central opening, and formed with a lateral liquid inlet and outlet disposed respectively below and above said partition; said casing bottom being declined to its opening and being provided with a removable closure for the latter; said casing top having an upstanding flange around its opening and bosses in the angle between the flange and top integrally joined to said flange and top, a cylindrical strainer having an open lower end engaging the aforesaid partition around its opening, the upper end of said screen being surrounded by and spaced from said flange and having a dome-like top, a dome-like cover plate resting on said flange and having projecting means on its lower side engaging said screen top, and securing studs for said cover plate threaded into the aforesaid bosses.

In testimony whereof I have hereunto affixed my signature.

WALTER S. BRUBAKER.